Nov. 14, 1967  H. M. FORMAN  3,352,480
QUICK-OPENING SHRINK FILM PACKAGE AND PACKAGING METHOD
Filed May 4, 1966

INVENTOR
HAROLD M. FORMAN
BY
Bilker, Kimmelman + Moyerman
ATTORNEYS.

United States Patent Office 3,352,480
Patented Nov. 14, 1967

3,352,480
QUICK-OPENING SHRINK FILM PACKAGE
AND PACKAGING METHOD
Harold M. Forman, 2510 Grant Road,
Broomall, Pa. 19008
Filed May 4, 1966, Ser. No. 547,509
9 Claims. (Cl. 229—51)

This invention pertains to shrink packaging. More particularly it pertains to shrink packages which can be quickly and easily opened and to methods of making such packages.

The techniques, advantages and attributes of shrink packaging are well known to those skilled in the art. The general subject matter is fully discussed in an article entitled "The Growth of Shrink Packaging" by Robert D. Lowry which appears at pages 243 et seq. in the 1965 edition of "The Modern Packaging Encyclopedia."

These packaging techniques take advantage of the unique properties of various axially oriented thermoplastic films. These films, when heated, shrink in either or both length and width.

As used henceforth herein, the term "axially oriented thermoplastic film" is intended to encompass all materials which are adapted for use in connection with shrink packaging. Illustrative of such materials are those listed in the table on page 243 of the article cited above. Such materials include, for example, polyester (e.g. such as that sold under the trademark HS Mylar); regular, crosslinked and irradiated polyethylenes; polypropylene; polystyrene; polyvinyl chloride; polyvinylidene chloride copolymers and rubber hydrochlorides. Further included are the biaxially oriented polyethylenes of the type described (column 2, lines 5 to 30 inclusive) in U.S. Patent No. 3,215,266; and polyvinyls of the type described in U.S. Patent No. 3,175,752.

Another important characteristic of these films, in addition to their ability to contract in length and/or width when heated, is their ability to heat-seal to themselves. This characteristic is also relied upon in many shrink packaging applications for forming heat-sealed edges which constitute the sealed perimetrical portion of a given package. With few exceptions, shrink films have this natural heat-sealing capability. Where no such natural capability exists, it may be imparted by coating the shrink film with compounds capable of bonding under heat and pressure.

As used henceforth herein, the term "heat-sealed edge" means a perimetrical portion of a package wherein a closure is effected by heat-sealing two juxtaposing surfaces. The surfaces may be of the same piece or of two different pieces of axially oriented heat-sealable thermoplastic film. Alternatively, they may comprise a piece of such film and a piece of non-heat sealable material (e.g. a backing board) which has been coated to impart heat-sealing characteristics, or two pieces of non-heat sealable axially oriented film (e.g. polyester) both of which have been coated with heat-sealing material or any combination of the above. It is common, for instance, in applications where a package comprises a backing board and a piece of axially oriented plastic film, to coat or impregnate the cardboard with polyvinyl chloride so that a shrink film, usually of the same material, can be heat-sealed thereto.

Heat sealing may be effected by pressing an electrical impulse heated wire or bar against two abutting pieces of film and thereby raising the temperature quickly at the immediate site of the heat-sealed edge into the sealing temperature range (e.g. 180–500° F.) of the particular film being used. A common type of device used with rolls of bi-folded film is called an "L-sealer" because the heated wire or bar is L-shaped and thus creates two adjoining edges simultaneously. The heated wire or bar in such machines also cuts through the film to trim the heat-sealed edges of the package. Once the wrapping and heat-sealing operations are performed, the package is passed through a heating zone which causes shrinkage of the film and tensions it about the wrapped item.

Opening shrink packages is often difficult. This is true because of the film, being under tension, has no loose or sagging areas where tearing can be easily initiated. Further, many of the films have a high uninitiated tear resistance making it extremely difficult to start a tear. Additionally, once the tear has been started, characteristics other than uninitiated tear resistance come into play and it is difficult to control the direction of the tear.

Tear initiating means found in the prior art, and suitable for materials such as cellophane, have been found generally unsuitable for axially oriented films. Various suggestions have been made for opening shrink packages including those shown in U.S. Patent No. 3,175,752 and 3,215,267. There is nonetheless a great need for an inexpensive shrink film package incorporating quick opening means.

Accordingly, it is an object of the invention to provide a shrink film package which includes easy to operate, foolproof quick opening means.

It is a further object of the invention to provide a method of making such a package which method can be performed, inter alia, with minor modifications to existing packaging equipment.

It is also an object of the invention to provide a film, with an elongated cutting member affixed thereto, which can be used in the method and package of the invention.

An additional object of the invention is to provide a shrink package which opening can be quickly and easily initiated even when utilizing film having a high uninitiated tear resistance, and wherein the film can then be progressively cut in a predetermined line despite any tendency of the cut to craze or change direction.

A further object of the invention is to provide a package wherein the means provided for predetermining the cutting direction will not unduly reduce the effective tensile strength of the film and thus permit the package to open during shrinking.

Still another object of the invention is to provide an inexpensive, rugged package suitable for all axially oriented thermoplastic films which possess, or have had imparted to them, heat-sealing characteristics which can be easily and readily opened and which is made by simple, inexpensive methods.

These and other objects of the invention will be apparent to those skilled in the packaging art from a consideration of the description which follows in conjunction with the drawing. In the drawing, wherein like reference numerals designate like parts:

Figure 1:
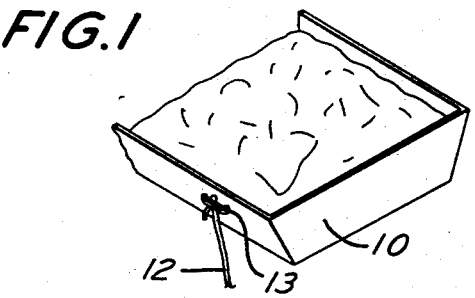
FIGURE 1 represents a fragmentary perspective of an item to be wrapped having an elongated film cutting member anchored thereto.
Figure 2:
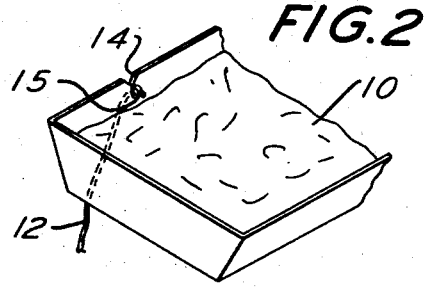
FIGURE 2 represents a fragmentary perspective of another item to be wrapped which also has an elongated film cutting member anchored thereto.
Figure 3:
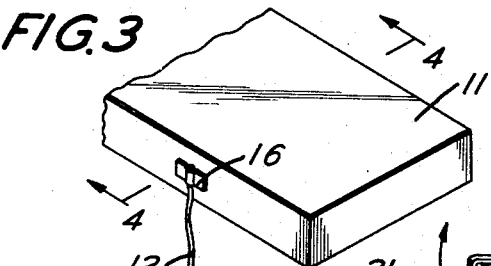
FIGURE 3 represents a fragmentary perspective of still another item to be wrapped having an elongated film cutting member anchored thereto.

Referring now to the drawings and considering FIGURES 1–3 en masse, they each show an item to be wrapped. In FIGURES 1 and 2 the item 10 is a carrier or tray such as is used to hold produce. In FIGURE 3, the item 11 is a parallelepipedal solid such as, for example, a box. These items are all wrapped by overwrapping with axially oriented thermoplastic film, heat-sealing on edge and thereafter shrinking the film by exposure in a heating zone. Each of these items is provided with an elongated cutting member 12. This cutter of relatively high tensile strength is preferably a thread or cord which may be made of a natural or syntheic fiber or which may be metallic. The material chosen is preferably one which will not char at the heat-sealing temperature of the film chosen. However, it has been found that due to the nature of hot wire impulse heating it is possible to use fibers which, in theory, would char at heat-sealing temperatures and to form heat-sealed edges about such fibers. In L-sealers ordinary cotton has been used with polyvinyl chloride film (which seals between 275 and 345° F.) without charring of the thread.

In the embodiment shown in FIGURE 1, the proximal end of flexible cutting member 12 is anchored to the item with a staple or fastener 13. In FIGURE 2, the proximal end of cutter 12 is anchored by providing a notch 14 and securing the cutter with respect thereto as with a knot 15. In FIGURE 3, the anchoring means is a tab 16, coated with an adhesive or otherwise secured to item 11. These embodiments are merely illustrative of a large number of ways in which member 12 can be anchored to items to be wrapped.

Figure 4:
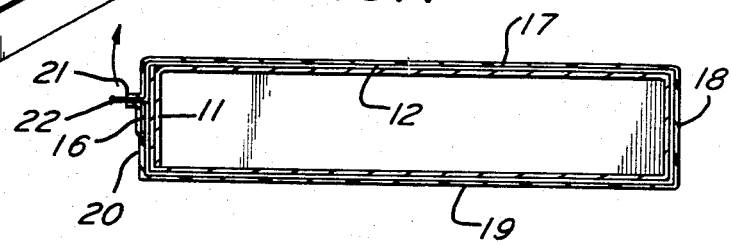
FIGURE 4 represents a section taken along line 4—4 of the item shown in FIGURE 4 as it would appear after being wrapped with an axially oriented thermoplastic film and subjected to heat treatment and is intended to be a generalized representation illustrative of packages of the invention.

FIGURE 4 is a cross-section through a shrink wrapped package formed about the item 11 shown in FIGURE 3. As shown, the overwrap is a single piece of axially oriented film wrapped about item 11 to form a package having a top 17, a long side 18 and a bottom 19. The side 20, opposite side 18, includes a heat-sealed edge 21. The ends of the package, which may also be heat sealed, are not shown.

As shown in FIGURE 4, the overwrap was formed from a single piece of film. However, with certain types of packaging equipment it is possible to form top 17 and parts of sides 18 and 20 from a first piece of film while forming bottom 19 and parts of sides 18 and 20 from a second piece. This is the case when "two roll" packaging machines are used as distinguished from machines using one roll of film which has been folded to a double thickness. Were the packages made from two rolls the only difference in FIGURE 4 would be the presence of another heat-sealed edge, such as 21, on side 18. There would be no difference with respect to the invention. Similarly bottom 19 could be a piece of different material to which heat-sealing characterstics have been imparted, as discussed above. The key purpose of FIGURE 4 as a visual aid will be apparent from a discussion of heat-sealed edge 21 vis-a-vis cutting member 12.

When the film is wrapped about item 11, prior to shrinking, cutting member 12 is brought around item 11. The proximal end is already secured by tab 16 and the proximal portion is positioned between the item and film surfaces 20, 19, 18 and 17. The member 12 is long enough to extend across the site of heat-sealed edge 21 with its distal portion 22 protruding therethrough. Formation of edge 21 creates a seal, cutting off any excess film simultaneously, but while encapsulating does not sever member 12. If member 12 has been pre-cut to length the distal extension 22 will automatically be of proper length for grasping. If member 12 is continuous it can be cut to suitable length during the packaging operation after formation of the heat-sealed edge 21. The package is then heat treated to place the film in tensioned heat-shrunk juxtaposition to item 11. For different packaging applications, the distance from tab 16 to edge 21 can be varied since it is not always necessary, in order to open a given package, to cut the film all the way around the cross-sectional perimeter.

Figure 5:
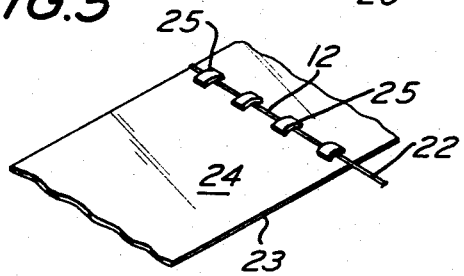
FIGURE 5 represents a fragmentary perspective view of a piece of axially oriented thermoplastic film, suitable for purposes of the invention having an elongated cutting member anchored thereto.

The remaining figures illustrate other means for retaining the cutting member 12 against displacement with respect to the film. In FIGURE 5 a piece of film, generally 23 is shown, the surface 24 of which will juxtapose an item to be wrapped in packages of the invention. The cutting member 12 is anchored to film 23 with a series of tabs 25. These may be discrete pieces similar to tabs 16 or, for application where an air-tight package is not necessary, may be formed by slitting film 23 and threading member 12 through the thus-defined tabs 25. This latter construction has the advantage, of special importance for tough films, of providing a pre-weakened cutting path for member 12.

Figure 6:
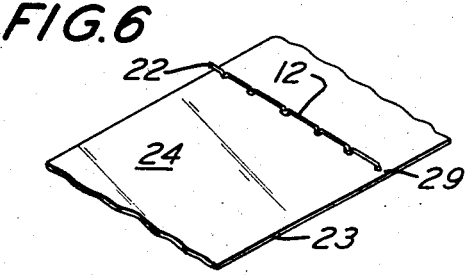
FIGURE 6 represents a fragmentary perspective view of another piece of axially oriented thermoplastic film having an elongated cutting member anchored thereto by sewing.
Figure 7:
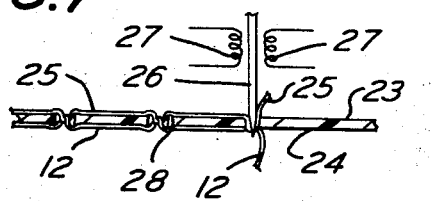
FIGURE 7 is a fragmentary cross-section diagrammatic representation of a method of manufacturing the film shown in FIGURE 6.

In FIGURE 6 different means are shown for anchoring member 12 to film 23. The anchor is a separate thread 25 which is sewn to the film and which attaches, as shown in FIGURE 7 to cutting member 12. A conventional sewing machine, represented by the needle 26, is utilized with the cutting member 12 being fed as the bobbin thread and the anchoring thread 25 being fed from the spool. This type of anchoring also has the advantage of providing a pre-weakened tear line.

With certain films, particularly those which may be too greatly weakened by mere sewing, it has been found advantageous to heat the needle, as with electrical heating coils 27. These coils heat the needle to a temperature less than the deterioration temperature of either thread or film but above the shrink temperature. As a consequence, a welt 28 is formed about each hole which prevents random spreading of the puncture and tends to heat seal the plastic about the thread. The following data is indicative of the differences in tensile strength observed with different commercial films. In all cases the threads were applied as shown in FIGURE 7, with holes 3/16 inch apart and with needle temperatures between 320° F. and 440° F. Tensile strength is expressed in thousands of pounds per square inch.

| Film type | Unstitched | Cold stitched | Hot stitch |
|---|---|---|---|
| Cast polyvinyl chloride | 13 | 5 | 9 |
| Extruded polyvinyl chloride | 10 | 7 | 8 |
| Polypropylene | 17 | 1.5 | 11 |
| Polyethylene | 7 | 5.5 | 6 |

Figure 8:
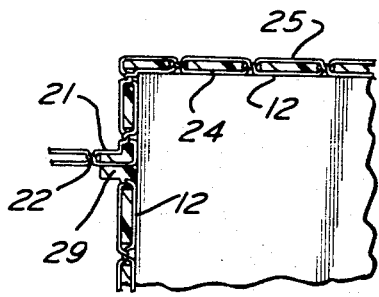
FIGURE 8 represents a fragmentary section of a package made using the film shown in FIGURE 6.

FIGURE 8 illustrates a fragment of package made with the material shown in FIGURE 6. Where the same type of item is to be wrapped again and again on a production basis, it is possible to apply a stitch to the film so as to leave a margin 29 which, in the package, is within the heat-sealed edge 21. Thus only one cutting member 12 is available to pass through edge 21. Further, when the film is sewn the threads can be cut to a length which will leave the distal end 22 of cutter 12 (as well as the distal of end 25) protruding through edge 21 so that they can be grasped to initiate the cut. As is the case of the package shown in FIGURE 4, the hot wire cuts through the film without damaging the cutting member.

All of the packages of the invention may be opened by grasping the distal end of the cutting member and pulling it toward the proximal end thereof to cause progressive cutting of the film. Because there is no reliance upon the tearing characteristics of the film, the cut will be linear in a direction predetermined by the position of the flexible cutter.

While various embodiments have been shown other variations will be apparent to those skilled in the art as they apply my teachings to particular product packaging problems. Accordingly, the scope of my invention is to be intepreted in accordance with the claims.

Having described my invention, I claim:
1. A package which comprises:
   (a) an item to be wrapped
   (b) a piece of axially oriented thermoplastic film in tensioned, heat-shrunk juxtaposition to said item, said film including at least one heat-sealed edge;
   (c) an elongated cutting member, the proximal portion of which is positioned between said item and said film and the distal end of which protrudes outwardly through said heat-sealed edge; and
   (d) anchoring means for retaining said cutting member against displacement with respect to said film;
opening of said package being effected by pulling the distal end of said cutting member toward the proximal end thereof to cause progressive cutting of said film.

2. The package of claim 1 wherein said cutting member is anchored to said item.

3. The package of claim 1 wherein said cutting member is anchored to said film.

4. The package of claim 3 wherein said cutting member is a thread and wherein said anchoring means comprises another thread on the opposite side of said film from said cutting member both of said threads being sewn together.

5. In a method of packaging an item with a piece of axially oriented thermoplastic film, wherein at least one edge of said piece is to be heat sealed and the film is, thereafter to be shrunk into tensioned juxtaposition with the item, the improvement which comprises the steps of:
   (a) placing an elongated cutting member between the item and the film with the distal end thereof extending across the site of the edge to be heat-sealed;
   (b) anchoring the proximal portion of said cutting member against displacement with respect to said film; and
   (c) heat sealing an edge of the film at the previously selected site to encapsulate said cutting member without severing at the point where it passes through said heat-sealed edge.

6. The method of claim 5 wherein said cutting member is anchored to the item.

7. The method of claim 5 wherein said cutting member is anchored to the film.

8. The method of claim 5 wherein said cutting member is a thread and wherein further it is anchored directly to the film.

9. The method of claim 8 wherein said thread is anchored by threaded engagement.

References Cited

UNITED STATES PATENTS

| | | | |
|---|---|---|---|
| 2,102,858 | 12/1937 | Schlumbohm | 229—51 X |
| 2,653,744 | 9/1953 | Behr | 229—66 X |

JOSEPH R. LECLAIR, *Primary Examiner.*

R. PESHOCK, *Assistant Examiner.*